J. N. PARKER.
AGRICULTURAL IMPLEMENT.
APPLICATION FILED MAR. 3, 1910.
965,736.
Patented July 26, 1910.
2 SHEETS—SHEET 2.
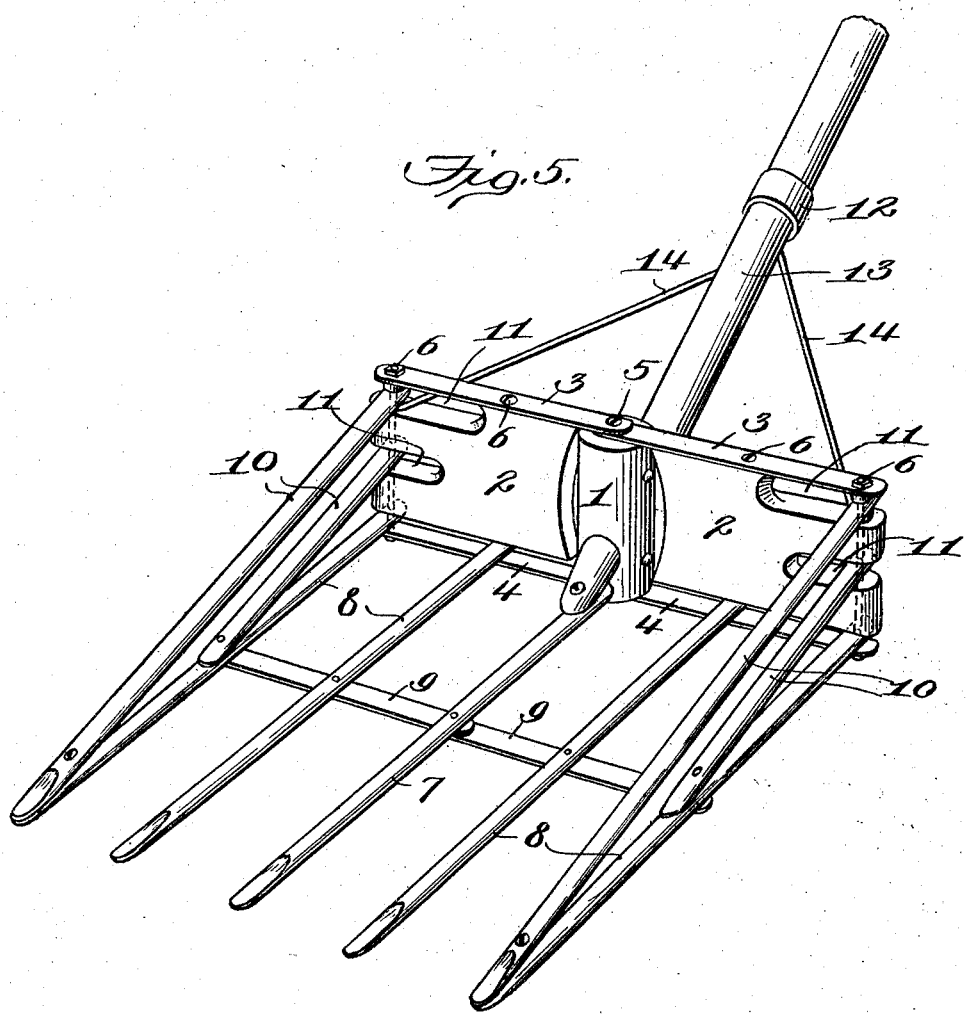
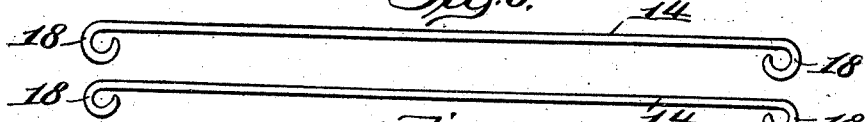
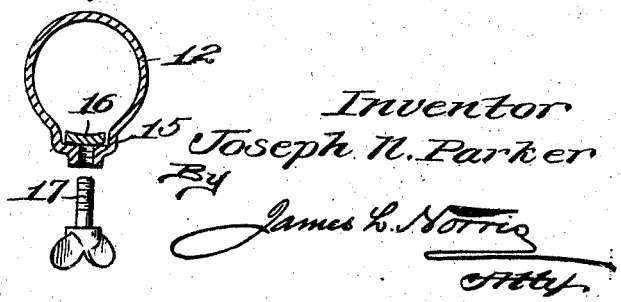

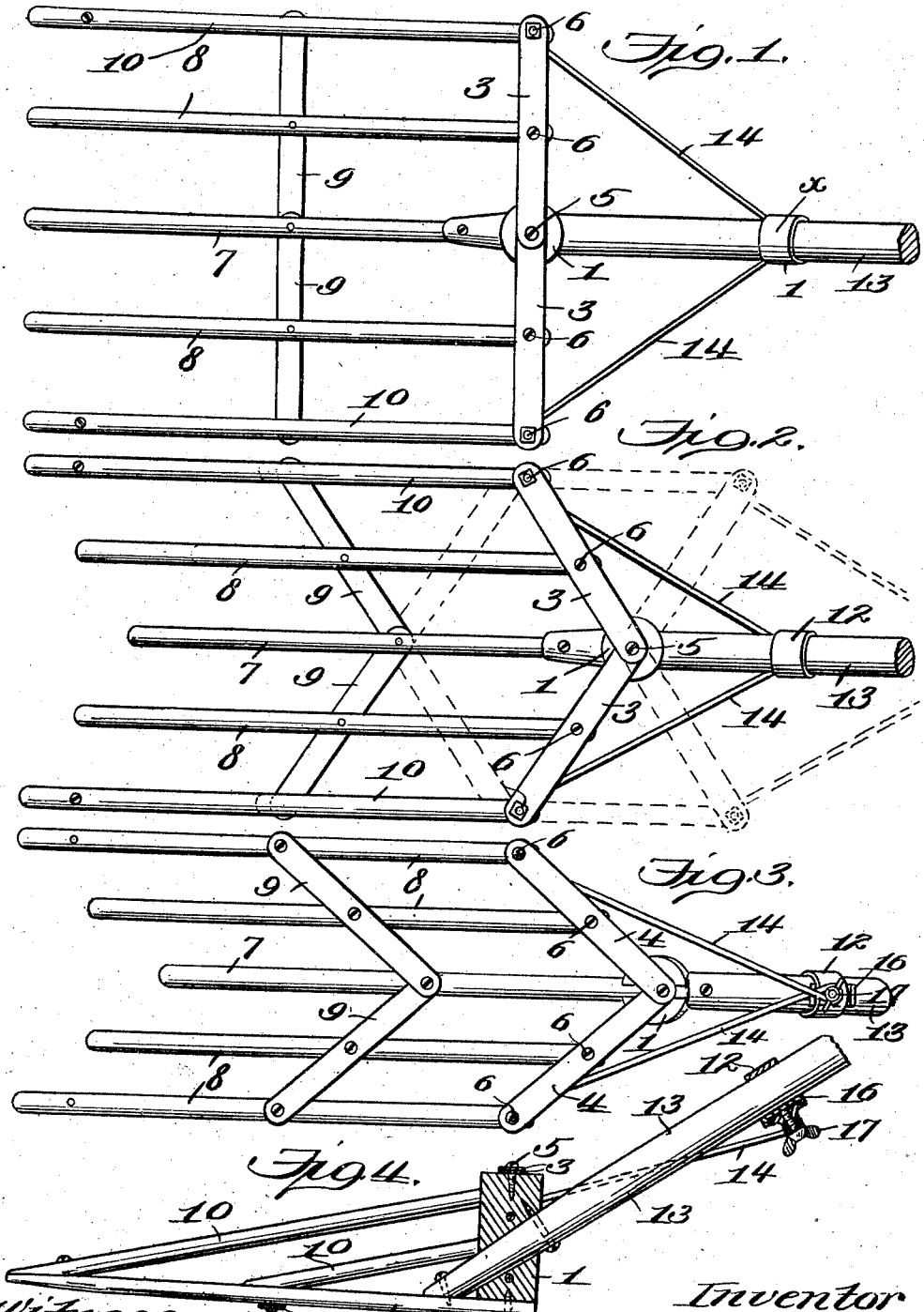

UNITED STATES PATENT OFFICE.

JOSEPH N. PARKER, OF KINGFIELD, MAINE.

AGRICULTURAL IMPLEMENT.

965,736.  Specification of Letters Patent.  Patented July 26, 1910.

Application filed March 3, 1910. Serial No. 547,045.

*To all whom it may concern:*

Be it known that I, JOSEPH N. PARKER, a citizen of the United States, residing at Kingfield, in the county of Franklin and State of Maine, have invented new and useful Improvements in Agricultural Implements, of which the following is a specification.

The present invention proposes an agricultural implement, which may advantageously be in the nature of a fork and which is especially applicable to sorting or grading operations.

As is well known, fruits or vegetables are graded into different sizes in order that the greatest returns may be realized from a yield, and it is customary to separate a large pile of fruits or vegetables into smaller piles, each representing some particular grade. In this manner those which are marketable are graded with regard to their size and consequent value and are separated from the smallest ones, which are unmarketable, at least, with material profit, but are more useful for feeding purposes.

With regard to the consideration stated, the present invention proposes, essentially, an agricultural grading or sorting fork, the organization of which includes a plurality of spaced tines which are adjustable toward and away from one another in order that the spaces between the tines may be varied to suit the conditions.

An embodiment of the invention is illustrated, by way of example, in the accompanying drawings, wherein—

Figure 1 is a plan view of an improved sorting or grading fork wherein the tines are spaced from one another to the greatest extent; Fig. 2 is a similar view wherein the tines are more closely associated; Fig. 3 is a bottom plan view wherein the tines have their greatest close association; Fig. 4 is a central longitudinal sectional view of the fork; Fig. 5 is a perspective view thereof; Fig. 6 is a detail view showing two similarly constructed connections to be hereinafter specifically referred to; and Fig. 7 is a detail sectional view showing a clamp construction to be hereinafter referred to.

Similar characters of reference designate corresponding parts throughout the several views.

In the embodiment under consideration the head construction comprises a centrally located hub, as 1, and two head pieces, as 2, which are disposed at opposite sides of the hub 1 and are connected therewith for horizontal swinging movement, by upper straps 3, and lower straps 4, which are pivoted to the hub 1 by screws or equivalent devices, as 5, which extend axially into the hub. Said straps are connected to the head pieces 2, in each instance, by two or more screws, bolts, or equivalent devices 6, which pass somewhat loosely through the straps.

A centrally located tine, as 7, is rigidly secured to the hub 1, and projects forwardly therefrom, and forwardly projecting tines 8 are located at each side of the centrally located tine 7 and are disposed in parallel relation thereto. To maintain this relation and likewise to provide for an adjustment of the spacing of the tines, the tines 8 have their inner end portions disposed between the links 4 and the head pieces 2 (Fig. 1), and pivoted on the bolts 6, and at some distance in advance of the head pieces, said tines are connected, lazy tong fashion, by straps, as 9, parallel to the straps 4, and having their inner end portions pivoted to the tine 7. The sides of the fork are constituted of the outermost tines 8, and obliquely disposed side bars, as 10, which have their forward end portions connected to said outermost tines, and their rear end portions disposed in slots 11 formed at the ends of the head pieces 2 and pivoted on the outermost bolts 6.

It will be apparent from the foregoing description of the specific embodiment under consideration, that the lazy tong relation between the tines and the connections thereof provides for simultaneous and equal adjustments of the spaces between the tines. An advantageous means for effecting such adjustments consists of a substantially annular clamp, as 12, which surrounds the handle 13, the latter being rigidly connected at its lower end to the hub 1, and links, as 14, which connect said clamp and the head pieces 2 and incidentally serve as braces between the shovel and the handle. The ring-like clamp 12, which is slidable axially of the handle 13, has at its under side a longitudinal dished portion, as 15, forming a seat for a friction shoe 16, and provided with a threaded opening in which is fitted a wing screw 17. The end of the screw 17 bears against the shoe 16 and it follows that the bearing engagement of the shoe with the handle is of a greater or less degree in accordance with the position of the screw in the threaded opening. The links 14 which are pivoted at their rear ends on the shank of the screw 17, extend forwardly in divergent relation, and at their forward ends are pivoted on the outermost bolts 6, the said links being formed at their ends with eyes 18 which surround said shank and said bolts.

When the head pieces 2 are disposed in a common vertical plane, as in Fig. 1, the greatest spacing of the tines is had. When, however, said head pieces occupy intersecting planes, the spacing of the tines is greater or less in accordance as the angle of the planes in which the head pieces are disposed, is greater or less. Thus, in Fig. 3, the angular disposition of the head pieces is less than in Fig. 2, and consequently the spaces between the tines are of less transverse dimension than the spaces in Fig. 2. It will be apparent that the variation of the angular disposition of the head pieces 2, and consequently of the spacing of the tines, is effected by sliding the clamping ring 12 to a desired position on the handle 13, a rearward movement of the ring 12 up to a certain point producing an increase of the angle defined by the head pieces, and a forward movement of the ring 12 from such certain point decreasing the angle defined by the head pieces. In all movements of the ring 12, between the certain point referred to (and which is the point of the location of said ring in Fig. 1, being represented at $x$) and the hub 1, the forward ends of the tines will be related concave-wise, as shown in full lines in Fig. 2. Movement of the ring 12 rearwardly of the point $x$, produces a corresponding decrease of the angle between the head pieces 2 (considering the angle to be then defined by the rear faces of said head pieces) and a corresponding decrease of the transverse dimensions of the spaces between the tines, and movement of the ring 12 from a point in the rear of the point $x$ toward the latter produces an increase of the angle defined by the head pieces and a corresponding increase of the transverse dimensions of the spaces between the tines. In all movements of the ring 12 between the point $x$ and any point in the rear thereof, the forward ends of the tines will be related convex-wise, as shown in dotted lines in Fig. 2.

For sorting the large sizes of fruits or vegetables, the maximum spacing shown in Fig. 1 is adopted and for intermediate sizes, the spacings shown in Figs. 2 and 3 may be adopted. It will be noted that the spacing of the tines may be regulated with exactness at any desired degree and that as many grades as desired may be sorted. It will be apparent, moreover, that the adjustments may be quickly and easily made, the manipulation of the clamp being all that is required.

Under certain conditions a convex-wise disposition of the ends of the tines may be desired and under other conditions a concave-wise disposition of said ends. The parts may be readily adjusted for a convex or concave-wise disposition of the ends of the tines, in the same manner, and, if desired, without altering the determined degree of spacing.

Having fully described my invention, I claim:

1. In a sorting or grading fork, a head construction comprising a centrally located hub, head pieces arranged at opposite sides of the hub and pivoted thereto for horizontal swinging movement, a plurality of tines having their inner end portions pivotally associated with the head pieces, the tines projecting forwardly from the head pieces, straps pivoted to one another at their inner ends and extending transversely of the tines in advance of, and in parallel relation to, the head pieces, the straps being pivoted to the tines across which they extend, a handle secured to the hub, a clamp ring slidably mounted on the handle, and links connecting the clamp ring and the head pieces.

2. In a sorting or grading fork, a head construction comprising a centrally located hub, head pieces arranged at opposite sides thereof, upper and lower straps pivoted to the hub and projecting at each side therefrom, the head pieces being pivoted between and to the straps, forwardly projecting tines pivoted between the lower straps and the head pieces, transverse straps located in advance of the head pieces and pivoted to the tines and at their inner ends to one another, inclined side bars having their ends pivotally associated with the outermost tines and the head pieces, a handle projecting rearwardly from the hub, an adjusting ring mounted on the handle and movable axially thereof, and links connecting the adjusting ring and the head pieces.

In testimony whereof I have hereunto set my hand in presence of two subscribing witnesses.

JOSEPH N. PARKER.

Witnesses:
SUMNER J. WYMAN,
LESLIE H. HUNNEWELL.